US007812979B2

(12) United States Patent
Takada et al.

(10) Patent No.: US 7,812,979 B2
(45) Date of Patent: Oct. 12, 2010

(54) INFORMATION PROCESSING APPARATUS, INFORMATION PROCESSING METHOD AND PROGRAM

(75) Inventors: Makoto Takada, Shiojiri (JP); Seiji Tanaka, Azumino (JP); Takayuki Uehara, Koshigaya (JP)

(73) Assignees: Seiko Epson Corporation, Tokyo (JP); King Jim Co., Ltd., Tokyo (JP)

( * ) Notice: Subject to any disclaimer, the term of this patent is extended or adjusted under 35 U.S.C. 154(b) by 1260 days.

(21) Appl. No.: 11/366,915

(22) Filed: Mar. 1, 2006

(65) Prior Publication Data

US 2006/0197986 A1 Sep. 7, 2006

(30) Foreign Application Priority Data

Mar. 2, 2005 (JP) ............................ 2005-057302

(51) Int. Cl.

| | |
|---|---|
| ***G06F 3/12*** | (2006.01) |
| *G06K 15/02* | (2006.01) |
| *G06K 15/00* | (2006.01) |
| *B41J 2/47* | (2006.01) |
| *B41J 3/32* | (2006.01) |
| *G09G 5/00* | (2006.01) |
| *G06F 17/00* | (2006.01) |

(52) U.S. Cl. .................... 358/1.13; 358/1.11; 358/1.12; 358/1.14; 358/1.15; 358/1.16; 358/1.17; 358/1.18; 347/240; 347/251; 347/252; 347/253; 347/254; 345/581; 715/274; 400/109.1

(58) Field of Classification Search ....... 358/1.11–1.18; 400/109.1; 434/114; 347/240, 251–254; 345/581; 715/274

See application file for complete search history.

(56) References Cited

U.S. PATENT DOCUMENTS

| | | | | |
|---|---|---|---|---|
| 5,193,921 | A * | 3/1993 | Tsukuda et al. | 400/109.1 |
| 7,112,000 | B2 * | 9/2006 | Kurashina et al. | 400/109.1 |
| 2002/0009318 | A1 * | 1/2002 | Maie | 400/109.1 |
| 2005/0281599 | A1 * | 12/2005 | Akaiwa | 400/76 |
| 2005/0281600 | A1 * | 12/2005 | Akaiwa et al. | 400/109.1 |

FOREIGN PATENT DOCUMENTS

| | | |
|---|---|---|
| EP | 0 962 909 | 12/1999 |
| JP | 60-076369 | 4/1985 |
| JP | 07242023 A | 9/1995 |
| JP | 08278727 A | 10/1996 |

(Continued)

*Primary Examiner*—Thierry L Pham
*Assistant Examiner*—Satwant K Singh
(74) *Attorney, Agent, or Firm*—Hogan Lovells US LLP

(57) ABSTRACT

There is provided an information processing apparatus previewing on a display screen ink-character information and braille information which are printed and embossed on the same process sheet, the apparatus including: an ink-character previewing device for previewing the ink-character information; a braille previewing device for previewing the braille information; and a preview switching device controlling the ink-character previewing device and the braille previewing device and capable of selectively switching a display mode among a display of only the ink-character information, that of only the braille information, and that of the ink-character information and the braille information when printing and embossing operations are performed in a manner in which the ink-character information and the braille information are at least partially overlapped with each other on the process sheet.

4 Claims, 11 Drawing Sheets

FOREIGN PATENT DOCUMENTS

| | | | | |
|---|---|---|---|---|
| JP | 09058114 | A | | 3/1997 |
| JP | 10-275206 | | | 10/1998 |
| JP | 2001-088358 | | | 4/2001 |
| JP | 2001088358 | A | * | 4/2001 |
| JP | 2001166683 | A | | 6/2001 |
| JP | 2004077928 | A | | 3/2004 |
| JP | 2004185478 | A | | 7/2004 |

* cited by examiner (NOTE: Ink-characters are transliteration of Japanese hiragana; braille characters are those of hiragana, not of alphabets. Same applies to other similar Figs. such as 8A, 8B, 9A to 9C, 10, and 11.)

FIRST PROCESS MODE : INK-CHARACTER PRINTING →BRAILLE EMBOSSING

SECOND PROCESS MODE : ONLY INK-CHARACTER PRINTING

THIRD PROCESS MODE : ONLY BRAILLE EMBOSSING

T1 : TAPE WIDTH OF 24 MM

T2 : TAPE WIDTH OF 18 MM

T3:TAPE WIDTH OF 12 MM

<PREVIEW SCREEN>

INFORMATION PROCESSING APPARATUS, INFORMATION PROCESSING METHOD AND PROGRAM

The entire disclosure of Japanese Patent Application No. 2005-057302, filed Mar. 2, 2005, is expressly incorporated by reference herein.

BACKGROUND

1. Technical Field

The present invention relates to an information processing apparatus, an information processing method, and a program for displaying a layout image (hereinafter simply referred to as "previewing") on a display screen ink-character information and braille information which are printed and embossed on the same process sheet.

2. Related Art

A known braille label is of a type in which braille characters recognizable by visually-impaired persons and ink characters recognizable by visually-normal persons are arranged side by side or overlapped with each other on the same process sheet (such as a tape) in such a way that they are recognizable by both visually-impaired and visually-normal persons. Reference is made to JP-A-10-275206 as an example of related art. Furthermore, a known information processing apparatus is of a type in which ink-character printing and braille embossing are simultaneously performed to form the above-described braille label. Reference is made to JP-A-2001-88358 as an example of related art.

With the above-described information processing apparatus, the user has difficulty identifying an image of braille information prior to an actual braille embossing since braille embossing is performed only after the user generates braille information by inputting and editing characters. It would be an advantage therefore to have an image of braille embossing displayed on a display screen, making it possible for the user to identify the image of braille information while inputting and editing ink-character information. In a case in which braille characters and ink characters are overlappingly arranged, however, images of ink-character printing and braille embossing are overlapped with each other and previewed on the display screen, which in turn hinders the user from identifying the both images. In particular, a small-sized display screen is fatal to identifying images.

SUMMARY

It is an advantage of the invention to provide an information processing apparatus, an information processing method, and a program, which allow the user to visually recognize images of both ink-character information and braille information with ease.

According to one aspect of the invention, there is provided an information processing apparatus previewing on a display screen ink-character information and braille information which are printed and embossed on the same process sheet. The apparatus comprises: an ink-character previewing device for previewing the ink-character information; a braille previewing device for previewing the braille information; and a preview switching device controlling the ink-character previewing device and the braille previewing device and capable of selectively switching a display mode among a display of only the ink-character information, that of only the braille information, and that of the ink-character information and the braille information when printing and embossing operations are performed in a manner in which the ink-character information and the braille information are at least partially overlapped with each other on the process sheet.

According to another aspect of the invention, there is provided an information processing method for previewing on a display screen ink-character information and braille information which are printed and embossed on the same process sheet. The method comprises selectively previewing a display of only the ink-character information, that of only the braille information, and that of the ink-character information and the braille information by switching operation when printing and embossing operations are performed in a manner in which the ink-character information and the braille information are at least partially overlapped with each other on the process sheet.

According to these configurations, a display mode of previewing on the display screen can be selectively switched among a display of only ink-character information, that of only braille information, and that of ink-character information and braille information. In other words, the user is allowed to select a desired display mode of previewing in accordance with the arrangement of ink characters and braille characters. Accordingly, even in the case of an arrangement in which ink characters and braille characters are overlapped with each other, the user is allowed to easily identify ink-character information and braille information by switching a display mode of previewing among them.

In this case, it is preferable that the braille previewing device display as the braille information the contour of an embossing point constituting a braille character in void when the ink-character information and the braille information are displayed.

According to this configuration, even if previewing is done with ink-character information and braille information overlapped with each other, the user is allowed to visually recognize the ink-character information through the braille information.

According to still another aspect of the invention, there is provided a program causing a computer to function as respective devices of the information processing apparatus as described above.

According to this configuration, it is possible to provide a program allowing the user to visually recognize images of both ink-character information and braille information with ease.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, description will be made about an information processing apparatus, an information processing method, and a program according to an embodiment of the invention, taking as an example a case where they are applied to a label forming apparatus which is capable of performing both ink-character printing and braille embossing and which serves to form braille labels recognizable by both visually-normal and visually-impaired persons.

Figure 1:
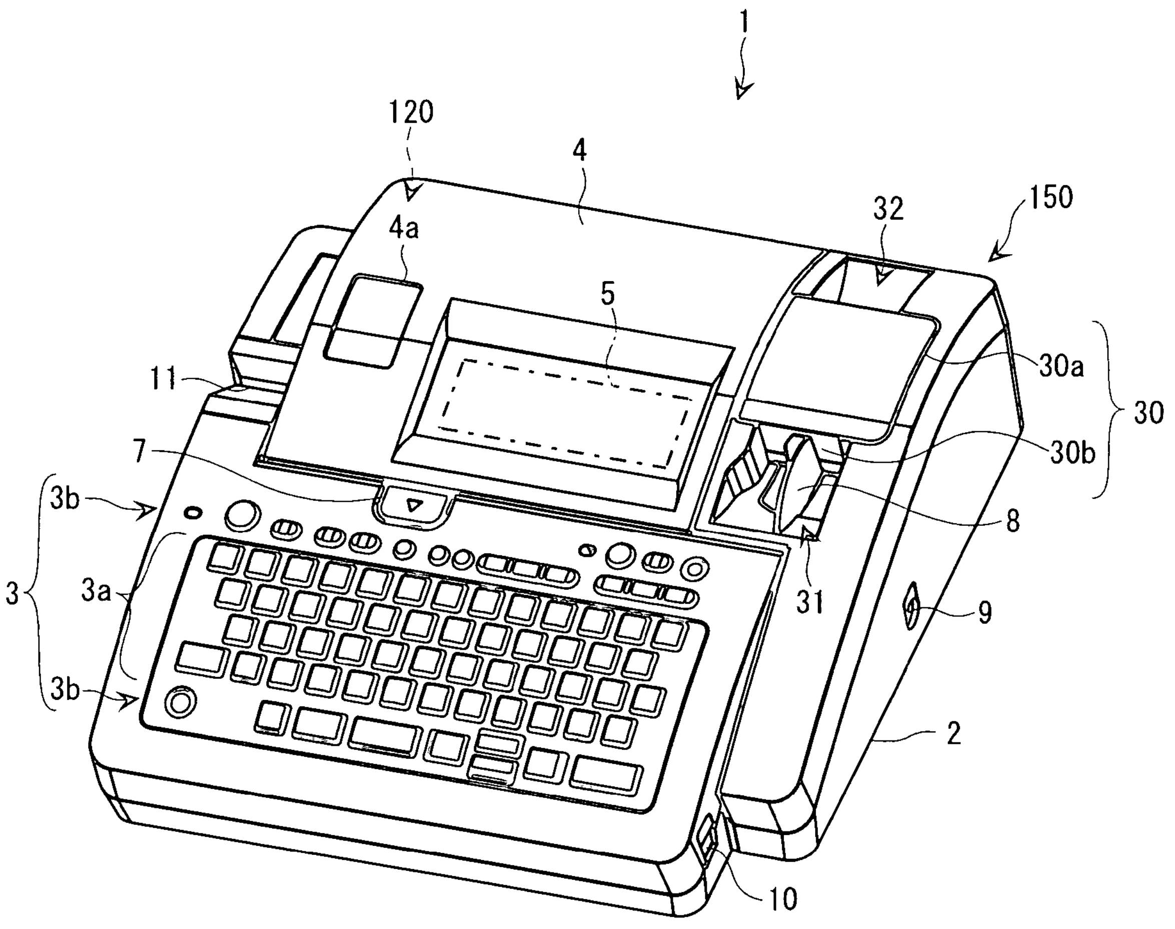
FIG. 1 is an external perspective view of a label forming apparatus with its lid closed.
Figure 2:
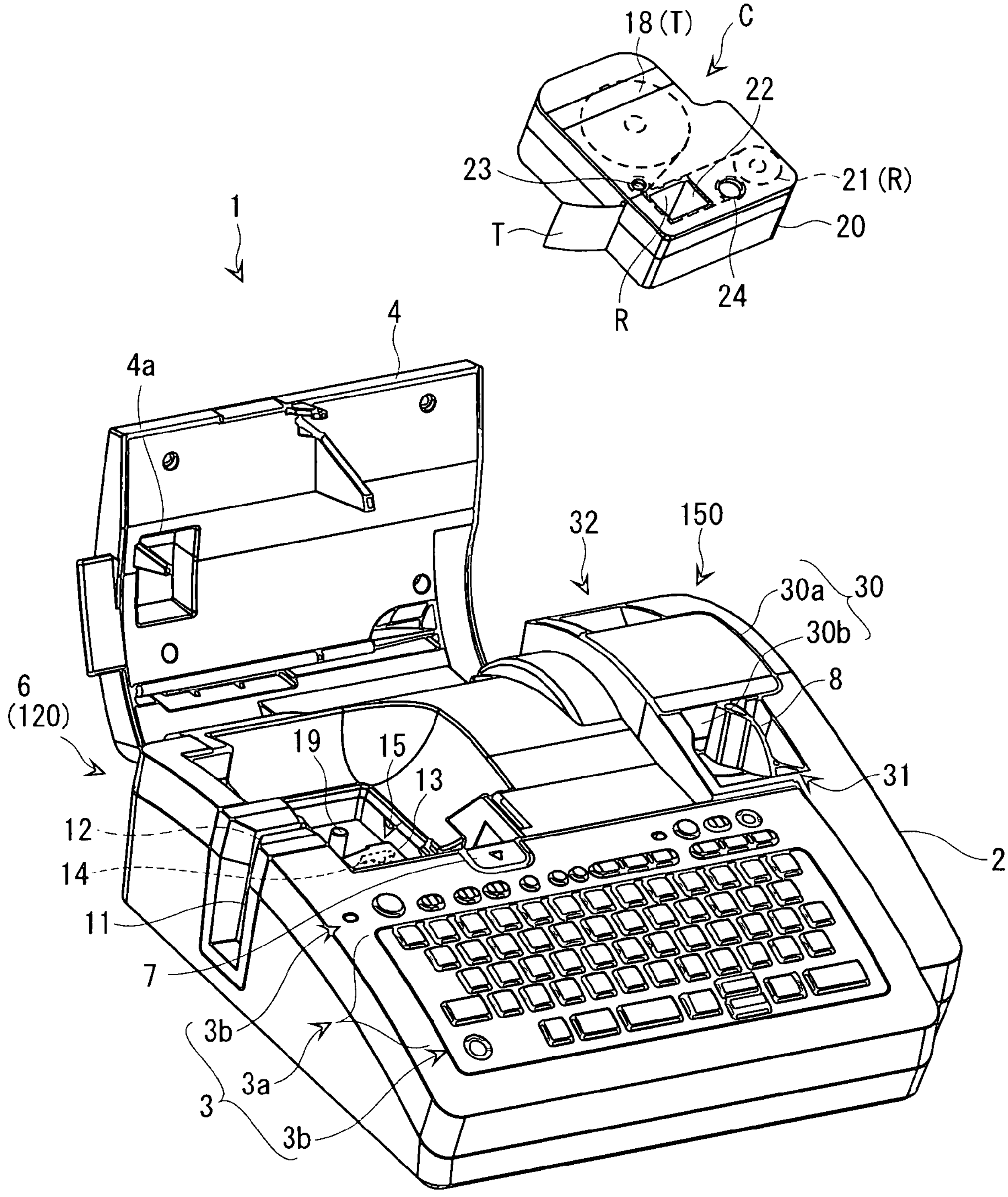
FIG. 2 is an external perspective view of the label forming apparatus with its lid opened.

FIG. 1 is an external perspective view of the label forming apparatus 1 with its lid closed, and FIG. 2 is an external perspective view of the label forming apparatus 1 with its lid opened. As shown in FIGS. 1 and 2, the label forming apparatus 1 has the contour formed by an apparatus casing 2 on which are disposed a keyboard 3 including various input keys and an opening and closing lid 4. Note that the keyboard 3 is disposed on the upper front surface of the apparatus casing 2, whereas the opening and closing lid 4 is disposed on the upper rear surface thereof. On the front center of the opening and closing lid 4, a display 5 is disposed.

Inside the opening and closing lid 4, a cartridge mounting section 6 (ink-character printing section 120) on which a tape cartridge C is mounted is formed with a groove at its left part, and the tape cartridge C is detachably mounted thereon when the opening and closing lid 4 is opened by the depression of a lid opening button 7. Furthermore, the opening and closing lid 4 has a view window 4a formed therein through which the mounting/non-mounting state of the tape cartridge C is discriminated while it is closed.

Furthermore, at the upper rear surface of the apparatus casing 2 on its right side are formed an embossing-tape inserting section 31 into which a printed/cut tape T ejected from the ink-character printing section 120, namely, a label is manually inserted (the user holds the label with fingertips to inserts the same into a braille embossing section 150) and an embossing-tape ejecting section 32 from which the tape T embossed in braille is ejected rearward. The main unit of the braille embossing section 150 is incorporated between the embossing-tape inserting section 31 and the embossing-tape ejecting section 32.

On the right side of the apparatus casing 2 are provided a power source supplying port 9 through which electric power is supplied and a connecting port 10 (interface) to which external units (not shown) such as a personal computer are connected. When the external units are connected to the connecting port 10, ink-character printing or braille embossing can be performed based on character information generated by the external units.

On the left side of the apparatus casing 2 is formed a printing-tape ejecting slot 11 through which the cartridge mounting section 6 communicates with the outside, where a tape cutter 12 which is driven by a motor (cutter motor 141: see FIG. 7) and serves like scissors faces on. When the tape T printed with ink characters is fed out, it is cut by a tape cutter 12 and ejected.

The keyboard 3 is used for inputting various specifications and data in the below-described controlling section 200 and has arranged thereon a character-key group 3*a* including an alphabet-key group, a symbol-key group, a numerical-key group, and a kana-key group, a function key group 3*b* for specifying various operations, or the like. The function-key group 3*b* includes a power-source key, a select key for data determination and line feed when a text is inputted and selecting various modes on a selection screen, a cancel key for canceling various inputs, a shift key for changing functions of respective keys, four cursor keys for moving a cursor and a display range of a display 5, a preview key for previewing print data, a printing/embossing key for starting printing/embossing operations, or the like.

The display 5 is rectangular with sides of approx. 12 cm in width (in X direction) and 5 cm in length (in Y direction) where display image data of 192 dots×80 dots can be displayed. The user views the display 5 when inputting character information through the keyboard 3 to form/edit ink-character data for ink-character printing and braille data for braille embossing. In addition, various error messages and various messages or command contents are displayed on the display to notify the user of the fact.

The cartridge mounting section 6 includes a head unit 15 with a head cover 13 incorporating a print head 14 composed of a thermal head, a platen driving shaft (not shown) arranged at a position opposite to the print head 14, a take-up driving shaft (not shown) for taking up the below-described ink ribbon R, and a positioning boss 19 for the below-described tape reel 18. In addition, underneath the cartridge mounting section 6 are embedded a print feeding motor 121 (see FIG. 7) for rotating the platen driving shaft (not shown) and the take-up driving shaft (not shown), and a power transmitting mechanism (not shown).

The tape cartridge C has a cartridge casing 20 in which are accommodated at the upper central part thereof and at the lower right part thereof the tape reel 18 around which the tape T with a uniform width is wound and a ribbon reel 21 around which the ink ribbon R is wound, respectively. The tape T and the ink ribbon R have the same width in size. At the lower left part of the tape reel 18 is made a through hole 22 into which the head cover 13 covering the head unit 15 is inserted. Besides, at a position where the tape T and the ink ribbon R overlap each other is arranged a platen roller 23 which is driven to rotate while being engaged with the platen driving shaft. On the other hand, a ribbon taking-up reel 24 is arranged adjacent to the ribbon reel 21. The ink ribbon R fed out from the ribbon reel 21 is fed in such a manner as to travel around the through hole 22 and taken up by the ribbon taking-up reel 24.

When the tape cartridge C is mounted on the cartridge mounting section 6, the head cover 13, the positioning boss 19, and the take-up driving shaft (not shown) are inserted into the through hole 22, the center hole of the tape reel 18, and the center hole of the ribbon taking-up reel 24, respectively. The print head 14 comes into contact with the platen roller 23 sandwiching the tape T and the ink ribbon R therebetween, which in turn makes it possible to perform ink-character printing. After ink-character data is printed based on inputted character information, the tape T printed with ink characters is fed to the printing-tape ejecting slot 11.

The tape T has a plurality of types varying in tape width, tape color, ink color of an ink character, tape material, etc. A plurality of holes (not shown) for discriminating the type of the tape T are provided on the rear surface of the cartridge casing 20. In addition, in the cartridge mounting section 6 are provided a plurality of tape discriminating sensors (micro switches) 171 (see FIG. 7) for detecting the type corresponding to the plurality of holes. The tape type can be determined by the tape discriminating sensors 171 and stored as tape information in a tape information block 235 (see FIG. 7).

Figure 3:
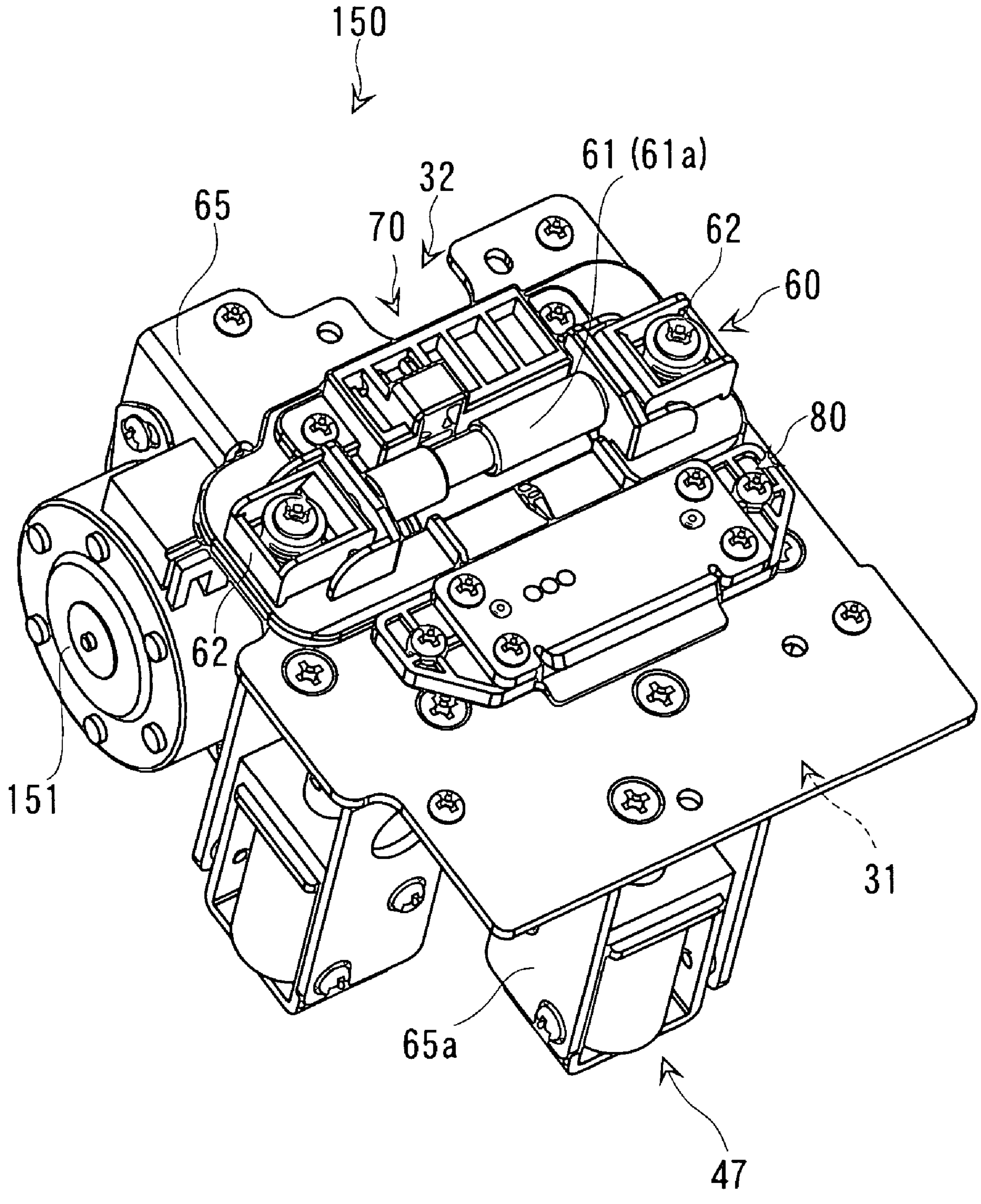
FIG. 3 is a perspective view showing the whole braille embossing section.

On the other hand, at the upper rear part of the apparatus casing 2 on its right side is incorporated a braille embossing assembly as the braille embossing section 150 having an apparatus frame 65 (see FIG. 3) embedded with the main constituent unit formed therein. As shown in FIG. 3, the braille embossing assembly includes an embossing unit 80 for performing braille embossing using three embossing pins 41 (see FIGS. 4A and 4B), a tape feeding mechanism 60 for feeding the tape T inserted into the embossing-tape inserting section 31 toward the embossing-tape ejecting section 32, a tape conveying path 70 ranging from the embossing-tape inserting section 31 to the embossing-tape ejecting section 32. Upon driving of the tape feeding mechanism 60, the three embossing pins 41 are selectively driven by the embossing unit 80 to form braille characters on the tape T fed along the tape conveying path 70.

The tape conveying path 70, the tape feeding mechanism 60, and the embossing unit 80 are disposed inside a transparent embossing-section cover 30 (see FIGS. 1 or 2) so as to prevent foreign materials from entering from the outside. The embossing-section cover 30 is composed of an upper surface cover 30*a* for sealing the top of the tape conveying path 70, a front surface cover 30*b* on the embossing-tape inserting section 31 side, and a rear surface cover on the embossing-tape ejecting section 32 side (not shown). The front surface cover 30*b* has an embossing tape inserting port (not shown) formed with an opening therein. The embossing-tape inserting port is formed such that the height and the width thereof correspond to the thickness of the tape T and the tape T with a wide width (24 mm), respectively. Note that the rear surface cover also has the embossing-tape ejecting port formed with an opening, having substantially the same shape as that of the embossing-tape inserting port.

The embossing-tape inserting section 31 and the embossing-tape ejecting section 32 are formed with a groove such that they are downwardly inclined toward the tape conveying path 70. In the embossing-tape inserting section 31 is provided a manual guide 8 for slidably changing the width corresponding to the two types of widths (12 mm and 24 mm) of the tape T in a direction orthogonal to the tape feeding direction. Using the manual guide 8 and a wall opposed thereto as a guide, the user inserts the tape T into the embossing-tape inserting section 31 with its printing surface upward.

As shown in FIG. 3, the tape feeding mechanism 60 is composed of a feed roller 61 rotatable in back and forth directions, a support member 62 for supporting the feed roller 61 on the apparatus frame 65 in a freely rotatable manner, and an embossing feeding motor 151 for rotating the feed roller 61 through a power transmitting mechanism (not shown). The feed roller 61 is a grip roller unit including a drive roller (not shown) and a driven roller 61*a*. An annular groove is arranged in the driven roller 61*a* in order to avoid interference of positions corresponding to vertical three embossing points so as not to smash the formed braille characters B.

Figure 4A:
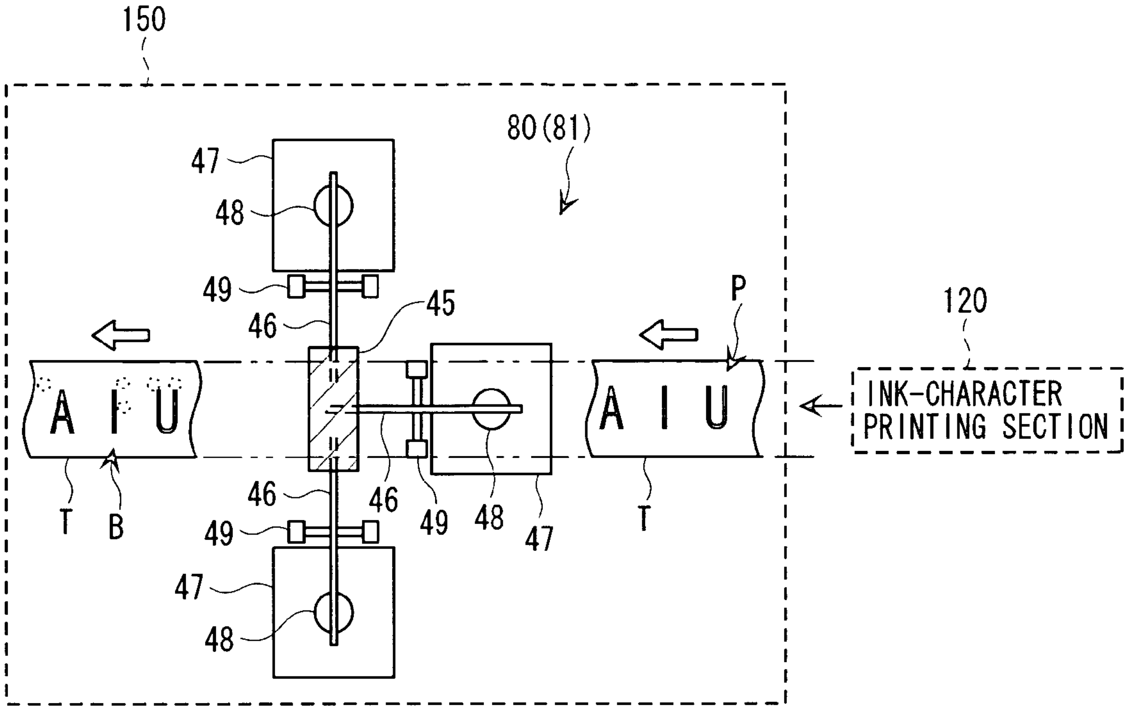
FIGS. 4A and 4B are a plan view and a cross-sectional view of an embossing unit.
Figure 4B:
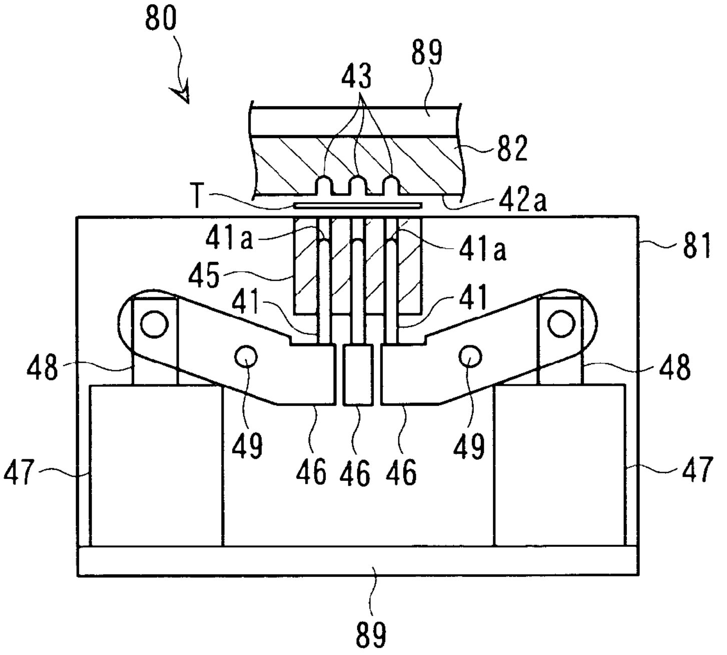

Referring next to FIGS. 4A and 4B, description will be made about the structure of the embossing unit 80. FIG. 4A is a plan view of the embossing unit 80 of FIG. 3 as seen from the top thereof, and FIG. 4B is a cross sectional view of the embossing unit 80. FIG. 4A shows a state in which the tape T (with a tape width of 12 mm) printed with ink characters is fed into the tape conveying path 70 from the embossing-tape inserting section 31 through a manual inserting operation and is then fed toward the embossing-tape ejecting section 32.

As shown in FIGS. 4A and 4B, the embossing unit 80 includes an embossing member 81 (embossing head) and an embossing-receiving member 82. The embossing member 81 is disposed on the rear surface side of the tape T and has the three embossing pins 41 built in a guide block, and the embossing receiving member 82 is disposed at a position opposite to the embossing member (embossing pins 41) 81 through the tape T.

The embossing member 81 includes the three embossing pins 41 arranged at intervals of 2.4 mm along the tape width direction (vertical direction in FIG. 4A) so as to correspond to vertical three embossing points from among six embossing points 302*a* to 302*f*, and is held perpendicular to the tape T by a guide member 45 guiding linear motion using solenoids as a driving source. A head portion 41*a* of each of the embossing pins 41 is formed in a cylindrical shape with rounded corners such that an embossing convex portion 302 is formed in a cylindrical shape with rounded corners.

Furthermore, one end of arm members 46 is connected to a tail portion of each of the embossing pins 41 in a semi-fixed manner. The other end of the arm members 46 is rotatably connected to a tip-end portion of each of plungers 48. At an intermediate portion of each of the arm members 46 is provided a support member 49 for rotatably supporting the same. The plungers 48 of the solenoids 47 are disposed in parallel with the embossing pins 41 so as to provide linear motion vertically with respect to the tape T. Accordingly, when the solenoids 47 cause the plungers 48 to provide linear motion, the arm members 46 rotate about the support members 49 serving as a fulcrum and the embossing pins 41 provide linear motion with respect to the tape T vertically.

Note that there are the three arm members 46, each connected to the three embossing pins 41, which are differently positioned: two of the three arm members positioned at the upper and lower ends extend (vertically) in such a manner as to be separated from each other in the tape width direction, and the other positioned therebetween extends in the feeding direction of the tape T. The three solenoids 47, each connected to the three arm members 46, are arranged in such a manner as to be positioned at each corner of a triangle.

On the other hand, the embossing receiving member 82 has three embossing receiving concave portions 43 formed on a face 42*a* thereof opposite to the three embossing pins 41 for receiving the same. The embossing receiving concave portions 43 are concave cylindrical with rounded corners in accordance with shape of the head portions of the embossing pins 41.

The embossing unit 80 forms the embossing convex portions 302 (see FIGS. 5A and 5B) on the tape T with the embossing pins 41 and the embossing receiving member 82. In other words, when the solenoids 47 are excited in accordance with braille data generated based on inputted character information and the plungers 48 are sucked, the embossing pins 41 are caused to move perpendicularly to the tape T after being guided by the guide member 45. The embossing pins 41 are then bumped into the corresponding embossing receiving concave portions 43 across the tape T, thus forming the embossing convex portions 202 on the tape T.

Figure 5A:
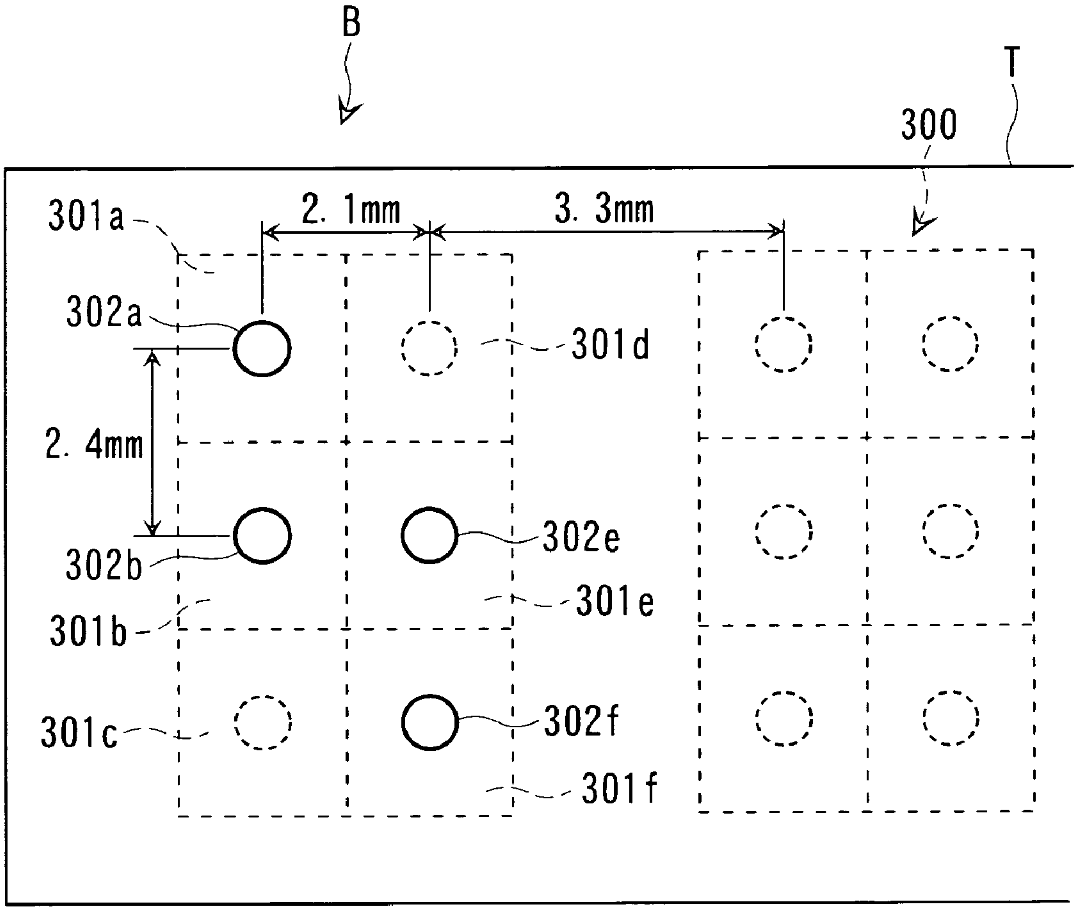
FIGS. 5A and 5B are illustrations of a six-point braille and a cross section of an embossing convex portion.
Figure 5B:
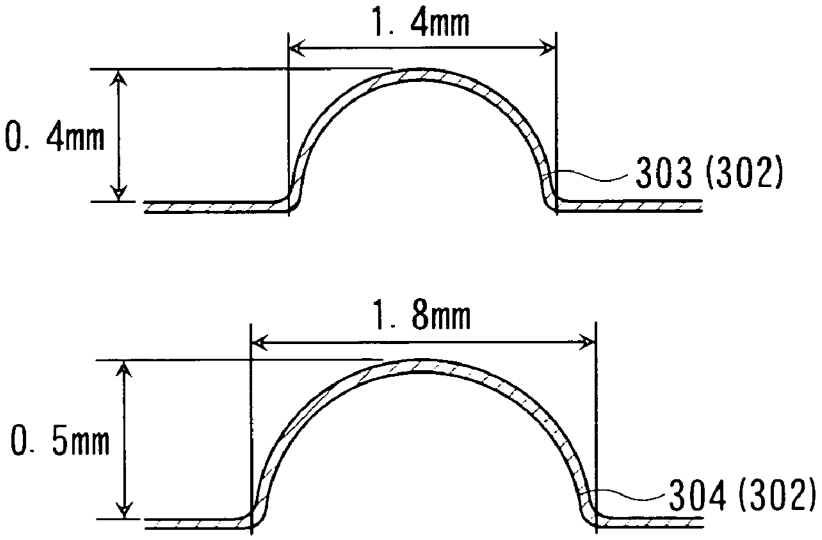

Referring to FIGS. 5A and 5B, description will now be made about braille characters B (six-point braille B) to be formed on the tape T. FIG. 5A shows a braille character B (braille data) indicative of character information of a Japanese hiragana "SHI." As shown in FIG. 5A, the six-point braille B forms one cell 300 constituted of six points (embossing dots) under an arrangement pattern of three vertically arranged points as arranged in two horizontal rows. The one cell 300 represents a character, a voice sound symbol, etc.

Note that, in addition to the six-point braille for representing kana-characters, numerals, etc., the braille B has a type of an eight-point braille for representing Chinese characters through bit patterns of points constituted of four vertically arranged points in two horizontal rows. Note that the label forming apparatus 1 of the present embodiment may emboss braille characters not only with the six-point braille but also with the eight-point braille.

In the six-point braille B, the one cell 300 is divided into six embossing points 301*a* to 301*f* under the arrangement pattern of three vertically arranged points as arranged in two horizontal rows. FIG. 5A shows a state in which four embossing points 301*a*, 301*b*, 301*e*, and 301*f* are selectively embossed from among the six embossing points 301*a* to 301*f*, and four embossing convex portions 302*a*, 302*b*, 302*e*, and 302*f* are formed on the tape T. Furthermore, six embossing convex portions 302 are approx. 2.4 mm in vertical pitch and approx. 2.1 mm in horizontal pitch. A pitch from a point in one cell to a point in another cell is approx. 3.3 mm.

FIG. 5B shows cross sections of the embossing convex portions 302. As shown in FIG. 5B, the embossing convex portions 302 are cylindrical with its corners rounded. Note that the embossing convex portions 302 are preferably in such shape (as it feels good to the touch). However, other shapes, such as a hemisphere shape, a cone shape, and a quadrangular pyramid shape may also be accepted.

Furthermore, the braille embossing section 150 of the embodiment may adopt two other types of mutually replaceable units as the embossing unit 80: one forms small embossing convex portions 303 and the other large embossing convex portions 204. The small embossing convex portions 303 are cylindrical with a diameter of approx. 1.4 mm and a height of approx. 0.4 mm. The large embossing convex portions 304 are cylindrical with a diameter of approx. 1.8 mm and a height of approx. 0.5 mm. These two types of embossing convex portions 303 and 304 may be used according to their intended purposes. For example, the small embossing convex portions 303 are intended for those familiar with reading the braille B (congenital blind people), and the large embossing convex portions 304 for beginners (noncongenital blind people).

Figure 6:
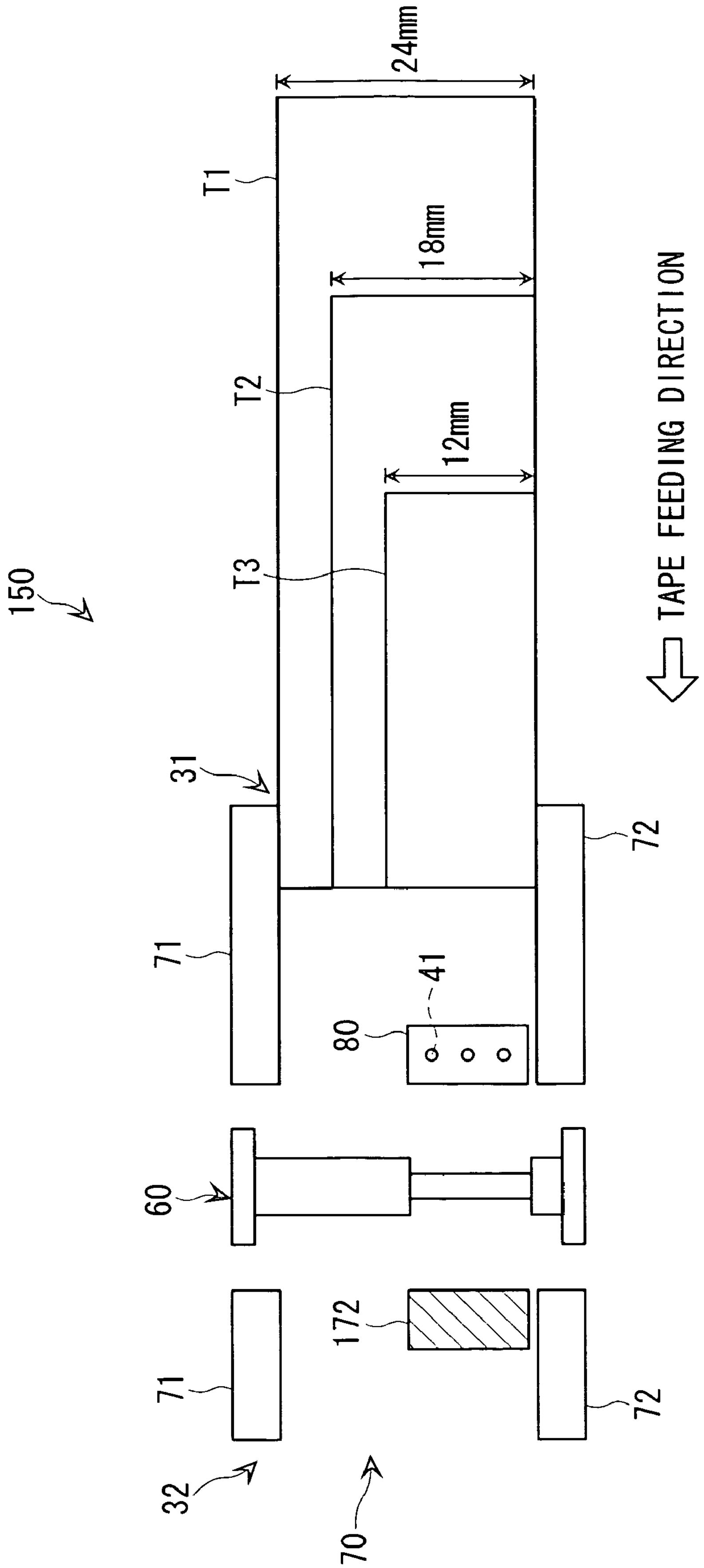
FIG. 6 is an illustration for explaining the feeding of a tape in the braille embossing section.

Next, referring to FIG. 6, description will be made about the feeding of the tape T in the braille embossing section 150. As described above, the braille embossing section 150 is composed of the embossing unit 80 for forming the embossing convex portions 302 on the tape T with the embossing pins 41, the tape conveying path 70 along which the tape T is fed, the tape feeding mechanism 60 for feeding the tape T along the tape conveying path 70, tape-guiding members 71 and 72 for guiding the feeding of the tape T, and a transmission tip-end detecting sensor 172 for detecting the tip end of the tape T.

In the embossing-tape inserting section 31, the three types of tapes in a decreasing order of the tape width, i.e., tape T1 (with a tape width of 24 mm), tape T2 (with a tape width of 18 mm), and tape T3 (with a tape width of 12 mm) can be inserted. The tape T1 with the maximum tape width is guided by the upper and lower guide members 71 and 72, whereas the tapes T2 and T3, each with a smaller tape width than that of the tape T1, are guided only by the lower guide members 72. For example, when the tape T3 with the minimum tape width is used, the user manually inserts it along the front lower guide member 72 until the tip end thereof reaches (namely, it is positioned in such a manner as to be inserted into) the tape feeding mechanism 60 (feeding rollers 61). Upon the insertion of the tape as a trigger, the tape feeding mechanism 60 starts feeding the tape T3.

Figure 7:
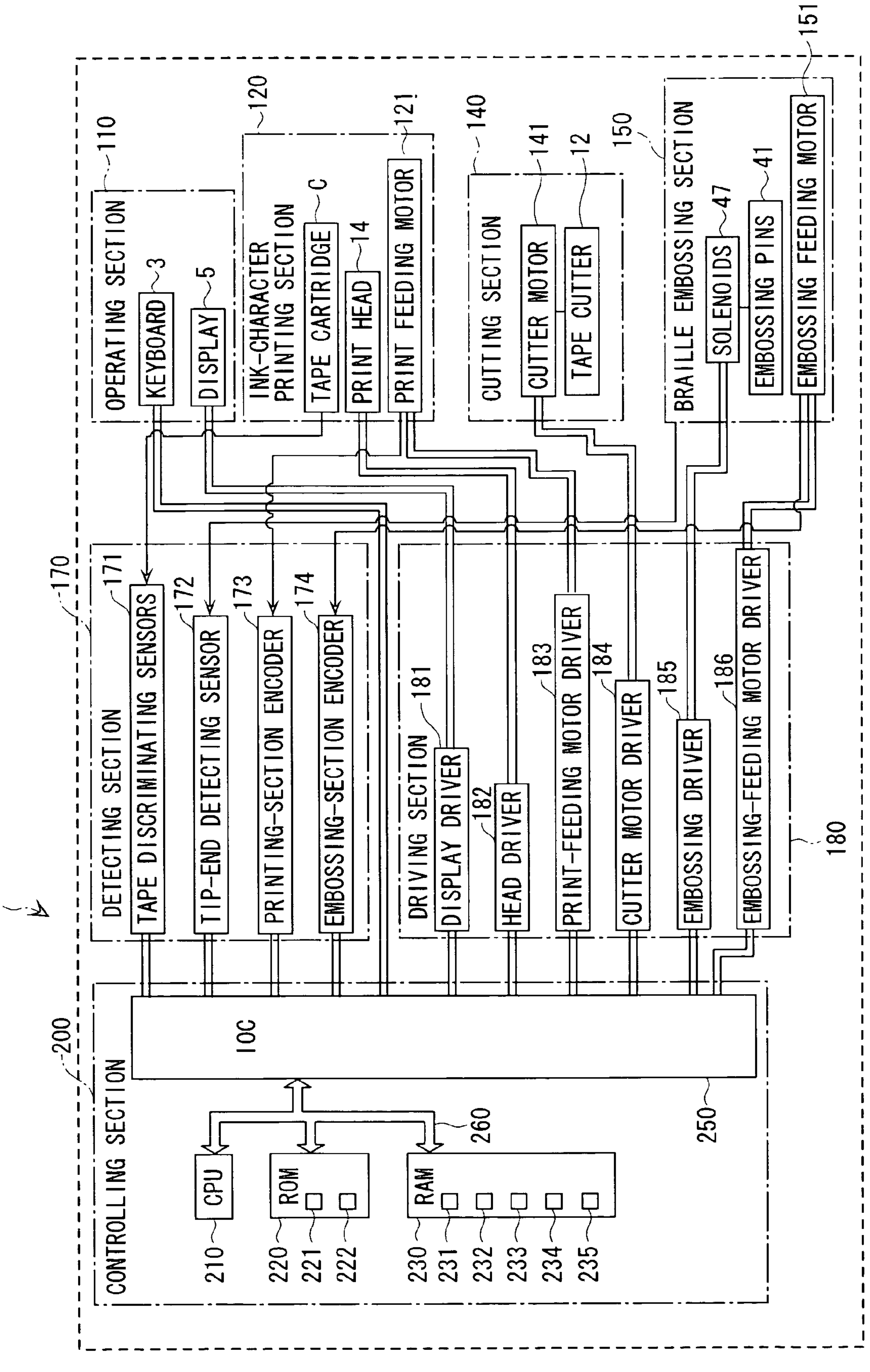
FIG. 7 is a control block diagram of the label forming apparatus.

Referring next to FIG. 7, description will be made about the control structure of the label forming apparatus 1. The label forming apparatus 1 is composed of an operating section 110 serving as a user interface, an ink-character printing section 120 for performing ink-character printing, a cutting section 140 for cutting the tape T into a predetermined length, a braille embossing section 150 for performing braille embossing, a detecting section 170 for performing various detections, a driving section 180 for driving each of the sections, and a controlling section 200 connected to each of the sections and controlling the whole label forming apparatus 1.

The controlling section 110 includes the keyboard 3 through which the user inputs character information and the display 5 on which various pieces of information are displayed. The ink-character printing section 120 includes the tape cartridge C, the print head 14, and the print feeding motor 121 and prints ink-character data based on ink-character text information on the tape T while the tape T and the ink ribbon R are fed. The cutting section 140 includes the tape cutter 12 and the cutter motor 141 for driving thereof and cuts the tape T into a predetermined length. The braille embossing section 150 includes the solenoids 47, the embossing pins 41, and the embossing feeding motor 151 and embosses braille data based on generated braille embossing data on the tape T while the tape T is fed.

The detecting section 170 has the tape discriminating sensors 171 for discriminating the type of the tape T (tape cartridge C), the tip-end detecting sensor 172 for detecting the tip end of the tape T in the braille embossing section 150, a printing-section encoder 173 for detecting the rotating speed of the print feeding motor 121, and an embossing-section encoder 174 for detecting the rotating speed of the embossing feeding motor 151. With such sensors and encoders, the detecting section 170 performs various detections.

The driving section 180 includes a display driver 181, a head driver 182, a print feeding motor driver 183, a cutter motor driver 184, an embossing driver 185 for driving the solenoids 47 and the embossing pins 41 of the braille embossing section 150, and an embossing-feeding motor driver 186 for driving the embossing feeding motor 151 of the braille embossing section 150. With such drivers, the driving section 180 drives each of the sections.

The controlling section 200 has a CPU 210, a ROM 220, a RAM 230, and an input/output controller (hereinafter, referred to as IOC) 250, all of which are connected to one another through an internal bus 260. The ROM 220 includes a control program block 221 and a control data block 222. The control program block 221 stores control programs for controlling various processes including processes of ink-character printing and braille embossing with the CPU 210. The control data block 222 stores character font data for ink-character printing and braille font data for braille embossing. Note that the character font data may be stored in a CG-ROM (character generation ROM), rather than in the ROM 220.

The RAM 230 has various work area blocks 231 to be used as a flag etc., an ink-character printing data block 232 for storing generated ink-character printing data, a braille embossing data block 233 for storing generated braille embossing data, a display data block 234 for storing display data to be displayed on the display 5, and a tape information block 235 for storing detected tape information. The RAM 230 is used as a work area for control processes. Furthermore, the RAM 230 is always battery-protected for holding stored data in case of power failure.

The IOC 250 has logic circuits including a gate array and a custom LSI incorporated therein for complementing functions of the CPU 210 and handling interface signals with various peripheral circuits. Thereby, the IOC 250 receives into the internal bus 260 input data or control data through the keyboard 3 either with or without processing the same. In addition, the IOC 250 outputs to the driving section 180 data or control signals outputted to the internal bus 260 from the CPU 210 either with or without processing the same while interlocking the CPU 210.

With the above configuration, the CPU 210 inputs various signals/data from each of the sections of the label forming apparatus 1 through the IOC 250 in accordance with the control programs of the ROM 220. Furthermore, the CPU 210 processes various data of the RAM 230 based on the inputted various signals/data and outputs the various signals/data to each of the sections of the label forming apparatus 1 through the IOC 250, thereby controlling the processes of ink-characters printing and braille embossing.

For example, when the user inputs character information through the keyboard 3, the CPU 210 generates ink-character printing data and/or braille embossing data based on inputted character information and temporarily stores the same in the ink-character printing data block 232 or the braille embossing data block 233. Furthermore, when the user instructs to print ink characters, the CPU 210 starts driving the print feeding motor 121 to drive the print head 14 in accordance with detection results of the printing-section encoder 173, thereby performing ink-character printing based on the ink-character data of the ink-character printing data block 232. Thereafter, the CPU 210 causes the tape to be fed at a predetermined length based on the ink-character printing data and the rear end portion thereof to be cut with the tape cutter 12. The tape T is thus ejected from the printing-tape ejecting slot 11.

When the user inserts the tape T from the embossing-tape inserting section 31 to perform braille embossing, the CPU 210 drives the embossing unit 80 and the tape feeding mechanism 60 to perform braille embossing based on braille embossing data in the braille embossing section 150. After braille embossing is finished, the embossing feeding motor 151 is driven to feed the tape and the embossed tape T is ejected from the embossing-tape ejecting section 32.

Figure 8A:
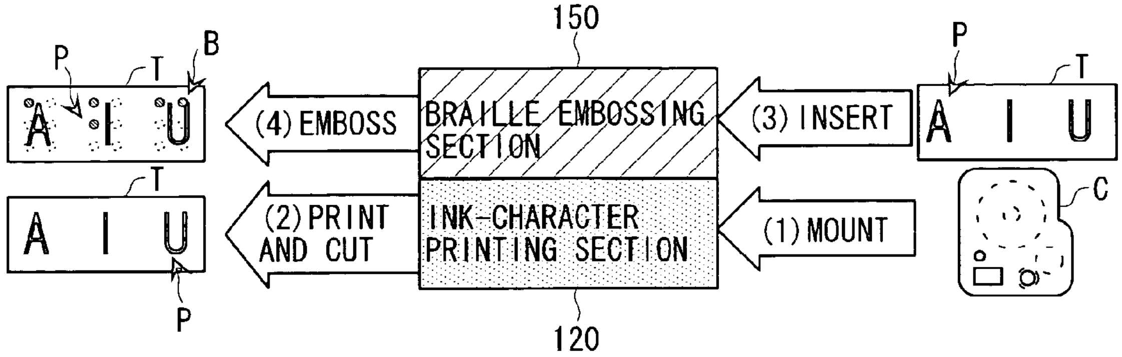
FIGS. 8A to 8C are illustrations for explaining process modes of the label forming apparatus.
Figure 8B:
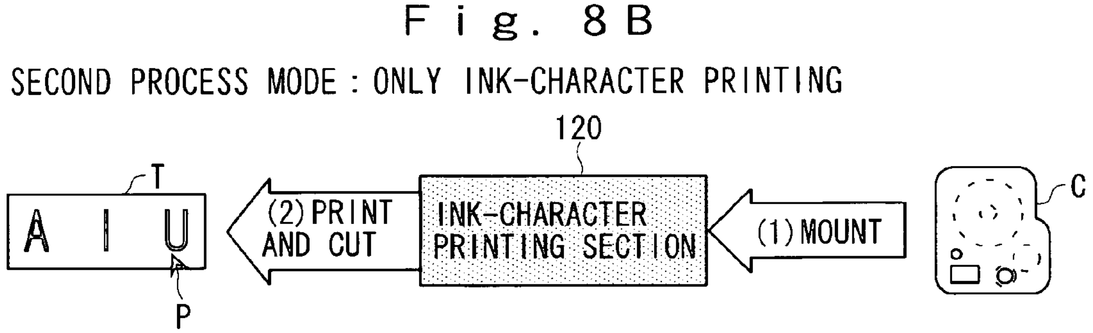
Figure 8C:
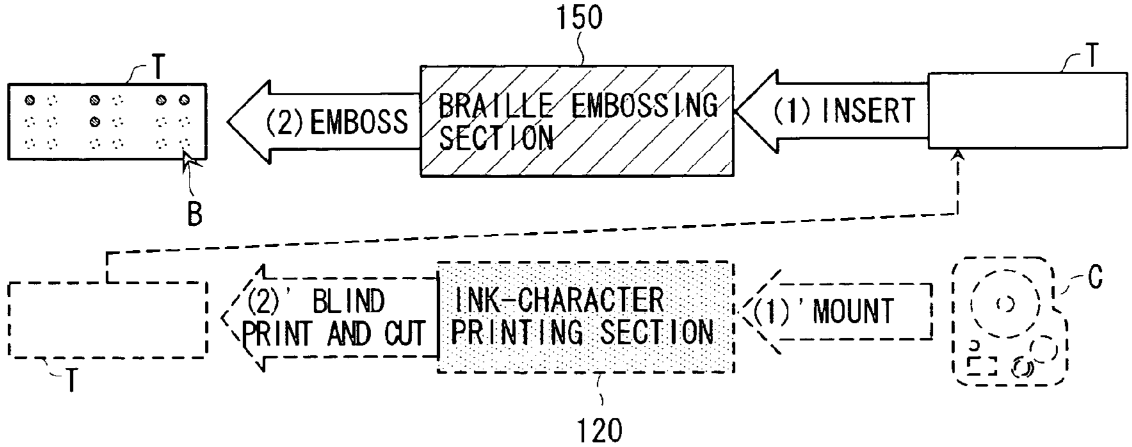

Subsequently, description will be made about process modes (print modes) of the label forming apparatus 1. The user can select a desired process mode from three process modes as shown in FIGS. 8A to 8C by a key operation using the keyboard 3. In a first process mode, two processes of ink-character printing and braille embossing are performed on the same tape T. As shown in FIG. 8A, after the tape cartridge C is mounted, the ink-character printing section 120 prints ink characters P, and the cut/ejected tape T is then inserted into the embossing-tape inserting section 31 (see FIGS. 1 or 2) and the braille embossing section 150 embosses braille characters B on the tape T. As a result, a label having ink characters and braille characters formed thereon is created. Note that the first process mode can also perform ink-character printing and braille embossing on the basis of different information.

In a second process mode, only an ink-character printing process is performed on the tape T. As shown in FIG. 8B, after the tape cartridge C is mounted, the ink-character printing section 120 prints ink characters P, and the tape T is cut and ejected. As a result, a label having ink characters formed thereon is created. In a third process mode, only a braille embossing process is performed on the tape T. After the strip-shaped tape T (tape cut into a given length) is manually inserted into the embossing-tape inserting section 31, the braille embossing section 150 embosses braille characters B on the tape T. As a result, a label having braille characters formed thereon is created.

Note that, in the third process mode, it is possible that blind printing (only the feeding of tape) is performed as shown in dotted lines of FIG. 8C so as to obtain the strip-shaped tape T for manual insertion and the cut/ejected tape T is used as the strip-shaped tape T therefor. Although omitted in the figures, the label forming apparatus 1 may adopt a specification in which the tape cartridge C is mounted on the upstream side of the braille embossing section 150 so that the elongated tape T fed out from the tape cartridge C is embossed in braille.

When the first process mode or the third process mode is selected, a message which prompts the user to eject the tape T from the printing-tape ejecting slot 11 and insert the same into the embossing-tape inserting section 31 may be displayed on the display 5. Alternatively, such a message may be displayed through an indicator or an LED.

Figure 9A:
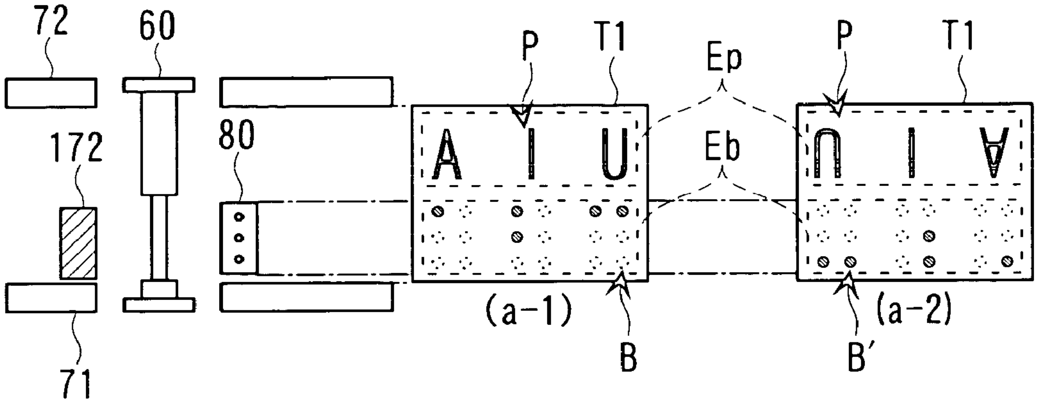
FIGS. 9A to 9C are illustrations for explaining an arrangement specification of an ink-character printing region and a braille embossing region on a tape T.
Figure 9B:
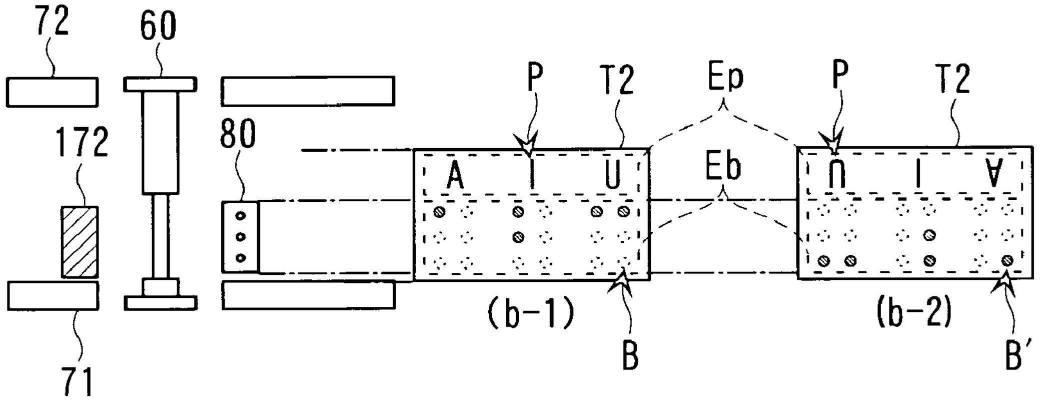
Figure 9C:
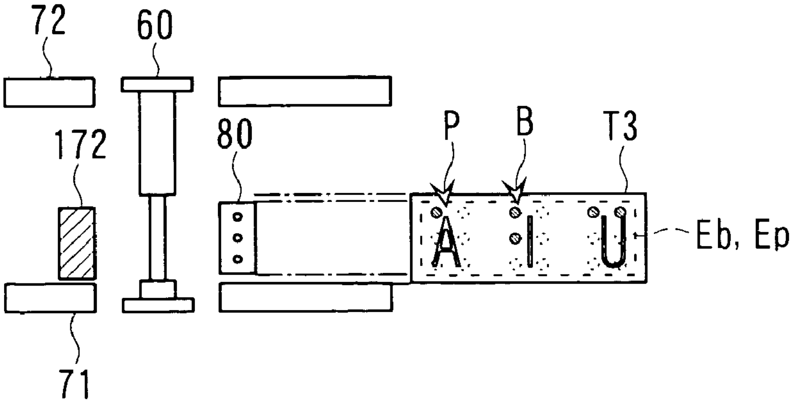

Moreover, when the first process mode for creating a label having ink characters and braille characters formed thereon is selected, the user can specify a desired printing/embossing layout by a key operation using the keyboard 3. As shown in FIGS. 9A to 9C, in a case that the tape T1 with a tape width of 24 mm is used (see FIG. 9A), a layout is selected from either of: a printing arrangement region Ep on the upper side and an embossing arrangement region Eb on the lower side (a-1), or the printing arrangement region Ep on the lower side and the embossing arrangement region Eb on the upper side (a-2).

Furthermore, in a case that the tape T2 with a tape width of 18 mm is used (see FIG. 9B), a layout is selected from either of: the printing arrangement region Ep on the upper side and the embossing arrangement region Eb on the lower side (b-1), or the printing arrangement region Ep on the lower side and the embossing arrangement region Eb on the upper side (b-2). In this case, however, the printing arrangement region Ep is made smaller in the tape width direction according to the tape width. In addition to the above layouts, in cases that the tapes T1 and T2 are used, a layout in which braille characters overlap with a part of ink characters printed in a desired size can also be selected.

In a case that the tape T3 with a tape width of 12 mm is used (see FIG. 9C), only the layout in which the printing arrangement region Ep and the embossing arrangement region Eb are overlapped with each other can be selected since the tape width is the minimum length for embossing the size (length in the tape width direction) of the braille cell 300 (see FIG. 6) (however, the printing arrangement region Ep and the embossing arrangement region Eb can be arranged in alignment in the longitudinal direction of the tape).

Description will now be made about a previewing function of the label forming apparatus 1. In the following description, let it be assumed that the first process mode for creating a label having ink characters and braille characters formed thereon is selected and the tape cartridge C accommodating the tape T3 with a tape width of 12 mm is mounted on the label forming apparatus 1. The label forming apparatus 1 according to the present embodiment is capable of previewing on the display 5 images of ink-character printing and braille embossing actually performed on the tape T on the basis of inputted ink-character information and braille information (ink-character previewing device and braille previewing device). Moreover, when the first process mode is selected, previewing is selectively switched among a display of "ink-character information and braille information," that of "only ink-character information," and that of "only braille information" (preview switching device).

Figure 10:
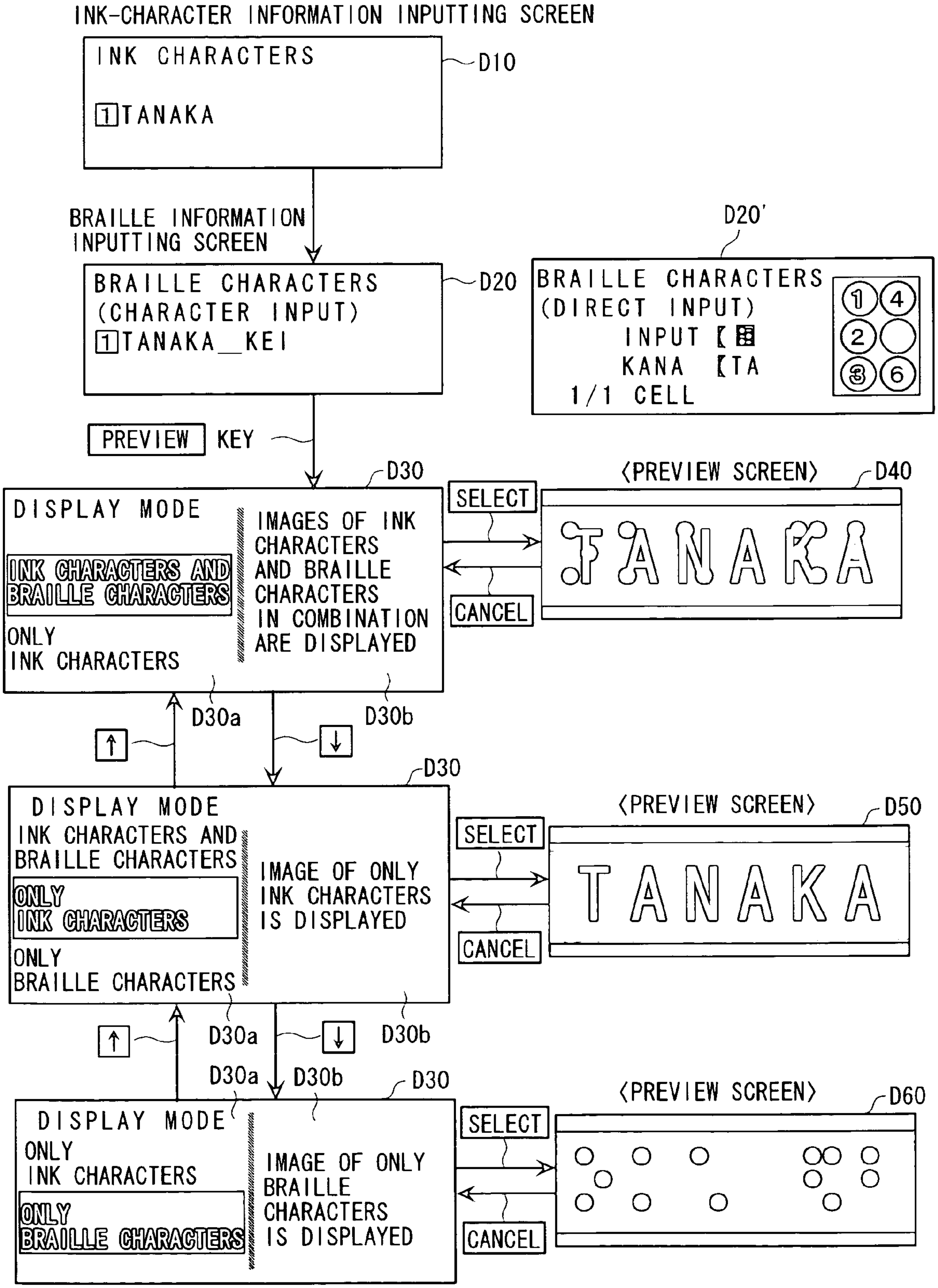
FIG. 10 is an illustration for explaining a procedure for a display mode of previewing in accordance with a screen display.

As shown in FIG. 10, when the user inputs ink-character information (shown as "TA" "NA" "KA" which are transliteration of Japanese hiragana but that the braille characters given therein are those of hiragana, not of alphabets in the figure) in an ink-character information inputting screen D10, inputs braille information (shown as “TA” “NA” “KA” “KE” “I” which are transliteration of Japanese hiragana but that the braille characters given therein are those of hiragana, not of alphabets in the figure) in a braille information inputting screen D20, and depresses the preview key for previewing, the label forming apparatus 1 displays a selection screen D30 in which a display mode is selected. The selection screen D30 is a screen in which the user selects a desired display mode from among a display of “ink-character information and braille information” (shown as “INK CHARACTERS AND BRAILLE CHARACTERS” in the figure), that of “only ink-character information” (shown as “ONLY INK CHARACTERS” in the figure), and that of “only braille information” (shown as “ONLY BRAILLE CHARACTERS” in the figure).

When the user selects “INK-CHARACTERS AND BRAILLE CHARACTERS” and depresses the select key in the selection screen D30, both ink-character information and braille information are previewed (see a preview screen D40). When the user selects “ONLY INK CHARACTERS” in the selection screen D30 and depresses the select key, only ink-character information is previewed (see preview screen D50). When the user selects “ONLY BRAILLE CHARACTERS” in the selection screen D30 and depresses the select key, only braille information is previewed (see preview screen D60). Note that the selection screen D30 includes an alternative display part D30*a* in which are displayed alternatives for allowing the user to select a display mode and an explanation display part D30*b* in which is displayed an explanation for an alternative currently selected (for example, an explanation that may read “IMAGES OF INK CHARACTERS AND BRAILLE CHARACTERS IN COMBINATION ARE DISPLAYED” is displayed for a display mode of “INK CHARACTERS AND BRAILLE CHARACTERS”).

In order to switch a display mode among “INK CHARACTERS AND BRAILLE CHARACTERS,” “ONLY INK CHARACTERS,” and “ONLY BRAILLE CHARACTERS” in the selection screen D30, the user is required to operate upward and downward cursor keys. Furthermore, in order to make a transition from the preview screens (D40, D50, and D60) to the selection screen D30, the user is required to depress the cancel key. In other words, the user is allowed to switch a display mode of previewing from among “INK CHARACTERS AND BRAILLE CHARACTERS,” “ONLY INK CHARACTERS,” and “ONLY BRAILLE CHARACTERS” with a simple operation. Accordingly, even in the case of a layout in which ink characters and braille characters are overlapped with each other, the user is able to visually recognize ink-character information and braille information with ease by switching a display mode of previewing from among “INK CHARACTERS AND BRAILLE CHARACTERS,” “ONLY INK CHARACTERS,” and “ONLY BRAILLE CHARACTERS.”

Note that the preview screens (D40, D50, and D60) display ink-character information and braille information in void (namely, in a state in which they are painted in white on a dark background). Accordingly, contrast between the ink-character information and the braille information and the background of the display screen involved is strikingly visible, thereby allowing the user to more clearly identify the ink-character information and the braille information. Furthermore, the whole background (of the display screen) is not painted in black, but the length in the width direction of the area painted in black is adjusted in accordance with the length in the width direction of the mounted tape T, thereby allowing the user to more clearly identify the images of ink-character information and braille information, each printed and embossed on the tape T. Note that, in inputting braille information, a direct input in which an embossing point is specified for each cell so as to input a braille character may be used in place of a usual character input (see braille information inputting screen D20' in FIG. 10).

Figure 11:
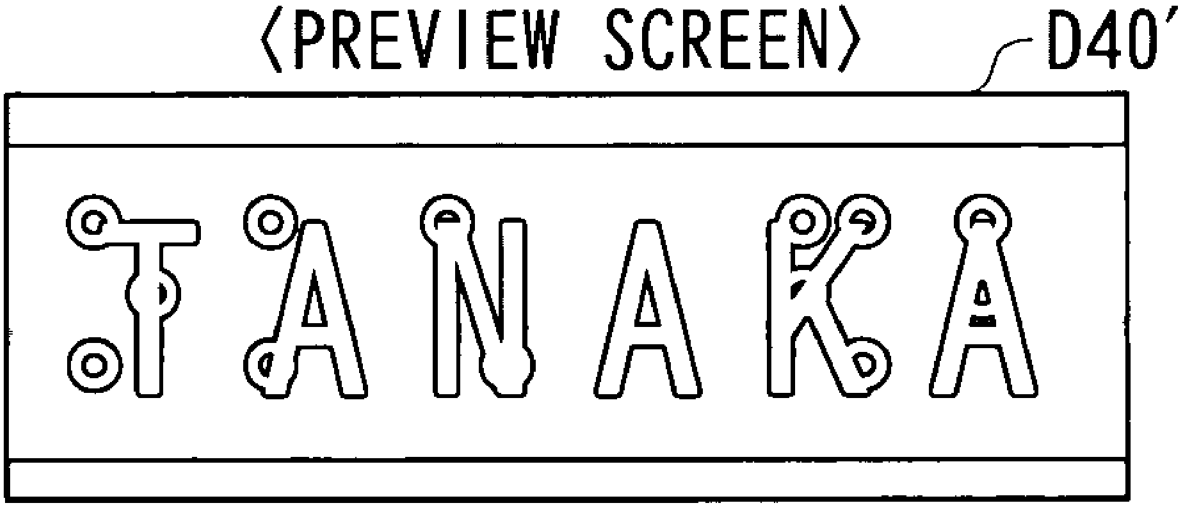
FIG. 11 is an illustration showing another example of a preview screen.

In the preview screen (D40) on which both ink-character information and braille information are previewed, the contour of embossing points constituting braille characters as braille information may be displayed in void as shown in the preview screen D40' of FIG. 11. According to this configuration, even if the preview screen is displayed with ink-character information and braille information overlapped with each other, it is made possible for the user to visually recognize the ink-character information through the braille information with ease.

Furthermore, each of the sections (functions) of the label forming apparatus 1 as shown in the foregoing examples can be provided as a program. It is possible that the program is stored in a storage medium (not shown) and provided. The storage medium may be in the form of a CD-ROM, a flash ROM, a memory card (a compact flash (registered trademark), a smart media, a memory stick, etc.), a compact disk, a magnetic optical disk, a digital versatile disk, a flexible disk, etc.

The structure and the process steps in the label forming apparatus 1 may be modified as needed without departing from the spirit and scope of the invention, without being bound by the examples as described above.

What is claimed is:

1. An information processing apparatus previewing on a display screen ink-character information and braille information which are printed and embossed on a same process sheet, the apparatus comprising:

- an ink-character previewing device for previewing the ink-character information;
- a braille previewing device for previewing the braille information;
- an ink-character and braille previewing device for previewing the ink-character information and the braille information; and
- a preview switching device capable of selectively switching a display among a display of the ink-character previewing device, a display of the braille previewing device and a display of the ink-character and braille previewing device,
- the ink-character previewing device and the braille previewing device displaying the ink-character information and the braille information in void on a dark background, and
- the ink-character and braille previewing device displaying the ink-character information in void and displaying a contour of an embossing point constituting a braille in void as the braille information.

2. The information processing apparatus according to claim 1, further comprising a tape mounting unit, wherein the process sheet is a tape and a length of a width direction of the dark background is variably displayed in accordance with a length in a width direction of the tape mounted in the tape mounting unit.

3. An information processing method for previewing on a display screen ink-character information and braille information which are printed and embossed on a same process sheet, the method comprising:

- selectively switching a display among an ink-character preview display that previews only the ink-character information, a braille preview display that previews only the braille information, and an ink-character and braille preview display that previews the ink-character information and the braille information;

displaying the ink-character information and the braille information in void on a dark background when in the ink-character preview display and the Braille preview display; and displaying the ink-character information in void and displaying a contour of an embossing point constituting a braille in void as the braille information when in the ink-character and braille preview display.

4. A computer-readable medium causing a computer to function as respective devices of the information processing apparatus according to claim 1 or 2.

* * * * *